(12) United States Patent
Schneider et al.

(10) Patent No.: US 10,207,948 B2
(45) Date of Patent: Feb. 19, 2019

(54) CORDIERITE GLASS-CERAMIC

(71) Applicant: SCHOTT AG, Mainz (DE)

(72) Inventors: Meike Schneider, Taunusstein (DE); Oliver Hochrein, Mainz (DE); Bianca Schreder, Sulzbach (DE); Bernd Ruedinger, Woerrstadt (DE); Martun Hovhannisyan, Frankfurt am Main (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 15/730,784

(22) Filed: Oct. 12, 2017

(65) Prior Publication Data
US 2018/0037493 A1    Feb. 8, 2018

(30) Foreign Application Priority Data

Jul. 10, 2016    (DE) .................... 10 2016 219 985

(51) Int. Cl.
| | | |
|---|---|---|
| *C03C 10/08* | (2006.01) | |
| *C03C 10/14* | (2006.01) | |

(Continued)

(52) U.S. Cl.
CPC ............ *C03C 10/0045* (2013.01); *C03C 3/06* (2013.01); *C03C 3/085* (2013.01); *C04B 35/195* (2013.01); *C04B 35/653* (2013.01); *C04B 2201/00* (2013.01); *C04B 2235/3203* (2013.01); *C04B 2235/3244* (2013.01); *C04B 2235/3256* (2013.01); *C04B 2235/3293* (2013.01);

(Continued)

(58) Field of Classification Search
CPC ................... C03C 10/0027; C03C 10/0045
See application file for complete search history.

(56) References Cited

U.S. PATENT DOCUMENTS 2,920,971 A  *  1/1960  Stookey ................. C03C 10/00
                                                        257/431
3,926,648 A  *  12/1975  Miller ................ C03C 10/0045
                                                        501/69

(Continued)

FOREIGN PATENT DOCUMENTS

| DE | 1045056 B | 11/1958 |
|---|---|---|
| DE | 102014219442 A1 | 3/2016 |
| EP | 2065346 A1 | 6/2009 |

OTHER PUBLICATIONS

R. Mueller, K. Erb, R. Haug, A. Klaas, O. Lindig, G. Wetzig: "Ultraprecision Dilatometer System for Thermal Expansion Measurements on Low Expansion Glasses", 12th Thermal Expansion Symposium, Pittsburgh/PA, P. S. Gaal and D. E. Apostolescu Eds., 1997.

(Continued)

*Primary Examiner* — Karl E Group (57) ABSTRACT

The present invention relates to an improved cordierite glass-ceramic. In order to improve the materials properties, it is proposed that the glass-ceramic comprising $SiO_2$, $Al_2O_3$, MgO and $Li_2O$ contains cordierite as main crystal phase and that a secondary crystal phase of the glass-ceramic comprises high-quartz solid solution and/or keatite solid solution. The invention further relates to a process for producing such a glass-ceramic and the use of such a glass-ceramic.

19 Claims, 2 Drawing Sheets

(51) Int. Cl.
*C03C 10/00* (2006.01)
*C03C 3/06* (2006.01)
*C04B 35/195* (2006.01)
*C04B 35/653* (2006.01)
*C03C 3/085* (2006.01)

(52) U.S. Cl.
CPC .. *C04B 2235/3418* (2013.01); *C04B 2235/77* (2013.01); *C04B 2235/80* (2013.01); *C04B 2235/96* (2013.01); *C04B 2235/9607* (2013.01)

(56) References Cited

U.S. PATENT DOCUMENTS

| | | |
|---|---|---|
| 4,540,671 A | 9/1985 | Kondo |
| 4,897,509 A * | 1/1990 | Holleran ............. C03C 10/0045 174/258 |
| 5,532,194 A | 7/1996 | Kawashima |
| 8,431,498 B2 * | 4/2013 | Hsu ........................ C03C 1/002 501/155 |
| 2013/0225392 A1 | 8/2013 | Fukui |
| 2016/0090324 A1 * | 3/2016 | Schreder ............... C04B 35/195 428/220 |

OTHER PUBLICATIONS

DIN 51045-1.
DIN 66137-1, issue: Nov. 2003.
ASTM C 693, issue: Nov. 1993, reapproved 2008.

* cited by examiner

Fig. 1

C = Cordierite
K = Keatite Solid Solution
R = Rutile
M = Mg$_2$TiO$_5$

CORDIERITE GLASS-CERAMIC

This application claims priority of German patent application DE 10 2016 219 985.

TECHNICAL FIELD OF THE INVENTION

The present invention relates to a cordierite glass-ceramic having particular properties, a component comprising such a glass-ceramic and the use and production of the glass-ceramic.

BACKGROUND OF THE INVENTION

Field of the Invention

With increasing miniaturization in semiconductor manufacture, materials having extremely low thermal expansion are required for satisfactory positioning accuracy in the microlithographic processes used for this purpose. Thus, accuracies in the region of 0.1 nm are required in the positioning of the wafers, so that a coefficient of thermal expansion of <0.5 ppm/K (i.e. $<0.5 \times 10^{-6}$/K), preferably <0.05 ppm/K, preferably <0.005 ppm/K, is required in order to avoid incorrect positioning due to small temperature fluctuations. The materials used in the microlithographic processes should at the same time have a high Young's modulus in order to ensure the mechanical stability of the components.

For components used here, e.g. substrate holders (known as wafer stages), either low-expansion glass-ceramics based on $Li_2O$—$Al_2O_3$—$SiO_2$ (LAS) glass-ceramics (e.g. Zerodur®) or sintered ceramics which are frequently based on cordierite are used nowadays. Glass-ceramics from the LAS system, in which lithium-high-quartz solid solutions form a main crystal phase, can be produced with a particularly low coefficient of thermal expansion of less than 0.02 ppm/K (in the temperature range 0-50° C.). A further advantage is that, as a result of the production method, they have no measurable porosity. However, their Young's modulus is generally only in the range from 90 to 95 GPa, which is too low for many applications.

Cordierite-containing ceramics, as are described, for example, in the US patent application US 2013225392 A, likewise have coefficients of thermal expansion in the range of <0.1 ppm/K in a narrow temperature range of 20-25° C. and are characterized by a Young's modulus of 140-145 GPa. However, such ceramics have, as a result of the production method, an unavoidable residual porosity and also a high hardness of about 8 GPa. These properties make working (grinding, lapping, polishing) and thus highly precise production of the components difficult. In addition, sintered ceramic components can tend to form dust. Since, for example, lithographic processes are carried out in a very clean environment, any dust formation is disadvantageous.

A ceramic is understood to be a material which is converted from a pulverulent material by heat treatment (sintering) into a body. A glass-ceramic is understood to be a material which is produced by a) melting a vitreous or amorphous, i.e. essentially crystallite-free precursor material, known as the green glass, from glass raw materials, b) cooling the green glass generally until complete solidification to form a vitreous body, c) optionally working the green glass body obtained in this way and d) subsequently reheating the green glass body by means of a heat treatment to a temperature below the melting temperature and thus producing the glass-ceramic by controlled crystallization of the green glass. Within the meaning of the present invention, a glass-ceramic is thus a material which has been produced by melting and subsequently converted by means of a controlled heat treatment (ceramization) into a glass-ceramic.

Cordierite glass-ceramics are known in the literature; first cordierite-containing glass-ceramics are described in the Patent DE 1045056 B of 1958. Apart from the main constituents MgO—$Al_2O_3$—$SiO_2$, $TiO_2$ is used as crystallization nucleus former. Addition of alkali metal compounds is not provided for here.

DESCRIPTION OF THE RELATED ART

EP 2065346 A1 describes a cordierite glass-ceramic which can be used, inter alia, for lithographic applications. The glass-ceramic contains not only the main constituents MgO, $Al_2O_3$, $SiO_2$ together with $TiO_2$ as crystallization nucleus former but also considerable amounts of further elements such as $CeO_2$, BaO, SrO, $SnO_2$, MnO, CuO, FeO and ZnO. Alkali metal oxides, on the other hand, are not present.

A cordierite glass-ceramic component for lithographic applications which contains $TiO_2$ and $ZrO_2$ as crystallization nucleus formers and in which at least 60% of indialite is present as crystal phase is claimed in DE 102014219442 A1.

However, none of these materials has a sufficiently low thermal expansion combined with a sufficiently high Young's modulus and low porosity.

It was therefore an object of the invention to provide an improved glass-ceramic which has a low coefficient of expansion and a high Young's modulus and does not have a disadvantageous porosity.

The object of the invention has been achieved by the subject matter of the independent claims. Advantageous embodiments and further developments are subject matter of the respective dependent claims.

SUMMARY OF THE INVENTION

The invention provides a glass-ceramic containing $SiO_2$, $Al_2O_3$, MgO and $Li_2O$, which contains cordierite as main crystal phase and whose secondary crystal phase comprises high-quartz solid solutions and/or keatite solid solutions.

The invention further provides a precision component comprising a glass-ceramic containing $SiO_2$, $Al_2O_3$, MgO and $Li_2O$, which contains cordierite as main crystal phase and whose secondary crystal phase comprises high-quartz solid solution and/or keatite solid solution.

These and other aspects and objects, features and advantages of the present invention will become apparent upon a consideration of the following detailed description and the invention when read in conjunction with the drawing Figures.

It is to be understood that both the foregoing general description and the following detailed description are merely exemplary of the invention, and are intended to provide an overview or framework for understanding the nature and character of the invention as claimed.

The entire disclosures of all applications, patents and publications, cited above and below, and of corresponding German application DE 10 2016 219 985 filed Oct. 13, 2016, are hereby incorporated by reference.

DESCRIPTION OF THE DRAWINGS

XRD patterns of three working examples (Examples 13, 14, 15) of the invention can be seen in FIG. 1.

DETAILED DESCRIPTION OF PREFERRED EMBODIMENTS

A glass-ceramic according to the invention has cordierite as main crystal phase and, according to the invention, comprises a deliberately produced secondary crystal phase which comprises keatite solid solution and/or high-quartz solid solution. The secondary crystal phase is preferably keatite solid solution. Keatite solid solution and high-quartz solid solution will be collectively referred to below as solid solution.

The nomenclature of the crystal phases, modifications and polymorphs is familiar to a person skilled in the field of glass-ceramics. Cordierite is, as is known, a magnesium-aluminium silicate. As secondary crystal phase, solid solutions of high-quartz (also referred to as ß-quartz) and/or keatite with additives are present in the glass-ceramic according to the invention. In the solid solutions, $SiO_2$ and $Al_2O_3$ form a framework structure in which relatively small ions can be incorporated as additive. The incorporation of lithium (Li) ions is preferred in the context of the invention. Depending on the starting composition and/or impurities therein, other ions can also be incorporated instead of or in addition to lithium into the solid solutions (e.g. ions of magnesium, zinc, iron, etc.). Such doping of the solid solution is possible in the context of the invention and may also be desirable in order to set the desired properties of the glass-ceramic. It is presumed that the secondary crystal phase brings about the low thermal expansion of the glass-ceramic according to the invention at the same time as a high Young's modulus due to the cordierite content. When "keatite" and/or "high-quartz" are spoken of below, this refers to the respective solid solution phase containing the additives.

A glass-ceramic according to the invention comprises, according to the general definition of a glass-ceramic, a crystal phase fraction and usually an amorphous fraction. The proportion of the amorphous regions in the glass-ceramic is preferably not more than 35% by volume, advantageously not more than 30% by volume, preferably not more than 25% by volume. In some glass-ceramics, the proportion of amorphous material can be no more than 20% by volume. In general, at least 5% by volume of the glass-ceramic is amorphous material in some advantageous embodiments. However, there are advantageous variants in which the proportion of amorphous material in the glass-ceramic is even lower. It is sometimes so low that it cannot be determined accurately without a great effort in terms of measurement. The proportion of crystal phase in the glass-ceramic is advantageously more than 50% by volume, preferably at least 65% by volume, more preferably at least 70% by volume. In particularly preferred embodiments, the proportion of crystal phase can be at least 80% by volume, according to one variant at least 85% by volume. In some embodiments, the proportion of crystal phase in the glass-ceramic can advantageously be at least 90% by volume, preferably at least 95% by volume, more preferably at least 97% by volume. Variants having a high proportion of crystal phase generally have a better thermal conductivity and a lower coefficient of thermal expansion.

In the context of the invention, a distinction is made between main crystal phase, secondary crystal phase and foreign (crystal) phase within the crystal phase: based on the total amount of the crystal phases, a main crystal phase is present when the proportion thereof makes up more than 50% by volume of the crystal phase. A secondary crystal phase is present when the proportion thereof forms less than or not more than 50% by volume of the crystal phase. The secondary crystal phases here are crystal phases which, due to their properties, contribute positively to the properties of the glass-ceramic, e.g. to setting the thermal expansion or to increasing the Young's modulus. In contrast thereto, foreign crystal phases are undesirable crystal phases whose presence in significant amounts has an adverse effect on the properties of the glass-ceramic, e.g. adversely affects the mechanical stability or the thermal expansion. The proportion of foreign crystal phases should therefore be minimized if possible.

According to the invention, cordierite forms the main crystal phase and thus brings about a high Young's modulus of the glass-ceramic. Cordierite is a magnesium-aluminium silicate having the idealized chemical composition $Mg_2Al_3[AlSi_5O_{18}]$. It is formed during ceramization from the glass components $SiO_2$, $Al_2O_3$ and MgO. In the context of the present invention, the term cordierite is used not only for the room-temperature phase of cordierite but also for its high-temperature polymorph, namely indialite. Indialite has the same stoichiometry as cordierite but differs in the distribution of the aluminium in the $(Al,Si)_6O_{18}$ ring and the crystallographic symmetry thereof. It is possible and also encompassed by the invention that foreign ions (e.g. lithium) are also incorporated into the cordierite.

Based on the crystal phase, the proportion of cordierite is more than 50% by volume, preferably at least 55% by volume, more preferably at least 60% by volume, particularly preferably at least 70% by volume. An advantageous upper limit to the cordierite content can be 95% by volume, preferably 90% by volume.

Based on the glass-ceramic, the proportion of cordierite is advantageously at least 45% by volume, preferably at least 50% by volume, more preferably at least 55% by volume. The upper limit of the cordierite content can preferably be not more than 80% by volume, more preferably not more than 75% by volume, also preferably not more than 70% by volume.

The secondary crystal phase is, in particular, formed by keatite solid solution and/or high-quartz solid solution (collectively also "solid solution"). Solid solution contributes to the targeted setting of the thermal expansion of the glass-ceramic and is formed during ceramization from the components $Al_2O_3$ and $SiO_2$. The solid solutions are preferably lithium solid solutions. However, lithium can also be entirely or partially replaced by other ions in the solid solution. Preferably, a maximum of 10 mol %, more preferably a maximum of 5 mol %, of lithium can be replaced in the solid solution. Preference is given to a solid solution which is formed substantially by the components $Li_2O$, $Al_2O_3$ and $SiO_2$. It has surprisingly been found that the thermal expansion is positively influenced, i.e. reduced in comparison with pure cordierite glass-ceramics, by the presence of solid solution as inventive secondary crystal phase, without the Young's modulus being decreased to the same extent.

Based on the crystal phase, the proportion of solid solution is advantageously at least 7.5% by volume, preferably at least 10% by volume, more preferably at least 20% by volume, particularly preferably at least 25% by volume. An upper limit of the proportion of solid solution can be <50% by volume, preferably 45% by volume, more preferably 40% by volume. During ceramization, high-quartz solid solution is transformed into keatite solid solution. After ceramization, the ratio of keatite solid solution:high-quartz solid solution is advantageously about 4:1, preferably about 6:1, more preferably about 9:1, particularly preferably about 9.5:1. In advantageous variants of the invention, complete transformation is attempted, i.e. solid solution consists virtually entirely of keatite solid solution.

Based on the glass-ceramic, the proportion of solid solution can advantageously be at least 5% by volume, preferably at least 10% by volume, more preferably at least 20% by volume. As an upper limit for solid solution, 40% by volume, advantageously 35% by volume, also advantageously 30% by volume, can be selected. In one embodiment, the glass-ceramic contains 20-30% by volume of solid solution.

Further constituents of the secondary crystal phase can be magnesium titanate ($MgTi_2O_4$), zirconium titanate ($ZrTiO_4$) and/or rutile ($TiO_2$) and/or a $MoO_3$-containing crystal phase.

Based on the crystal phase, not more than 10% by volume, preferably not more than 7.5% by volume, more preferably not more than 6% by volume, even more preferably not more than 3% by volume, of further secondary crystal phases (e.g. rutile, magnesium titanate, zirconium titanate, etc.) can advantageously be present. In one embodiment, the proportion thereof can be at least 0.75% by volume, advantageously at least 1% by volume.

Based on the glass-ceramic, not more than 7.5% by volume, preferably not more than 5% by volume, of other secondary crystal phases (e.g. rutile, magnesium titanate, zirconium titanate, etc.) can advantageously be present. Some embodiments can contain not more than 2.5% by volume of these phases. In one embodiment, the proportion of the other secondary crystal phases in the glass-ceramic can be at least 0.5% by volume, preferably at least 1% by volume. In some advantageous variants no further secondary crystal phase is present in the glass-ceramic besides the solid solution phase.

Based on the glass-ceramic, the sum of the proportions of main and secondary crystal phases is more than 60% by volume, preferably more than 70% by volume, particularly preferably more than 75% by volume, more preferably more than 80% by volume. In some embodiments, the sum of main and secondary crystal phases can also be more than 85% by volume. In particular embodiments, the sum of main and secondary crystal phases can be at least 90% by volume, advantageously at least 95% by volume.

Main and secondary crystal phases can contain small additions of other elements or ions. These phases have, as described above, a dopability. However, the proportion of foreign ions should only be so great that the properties of the glass-ceramic according to the invention are not too greatly influenced by the crystal phases formed or that the ions can still be incorporated into the crystal phases and the properties of these crystal phases are not altered adversely, but no separate undesirable crystal phases are formed.

The term foreign (crystal) phase encompasses all crystal phases occurring in the glass-ceramic according to the invention with the exception of the main crystal phase and the secondary crystal phases. Foreign crystals, which are generally undesirable crystal phases, are attributable to, for example, residual constituents of the melt, i.e. the type and number of the foreign crystals depend on the composition of the melt, impurities in the raw materials and also the processing and ceramization conditions. Foreign crystals formed can be, for example: magnesium silicates (e.g. enstatite, fosterite), gahnite (zinc spinel), anorthite ($CaO.Al_2O_3.2SiO_2$), celsian ($BaO.Al_2O_3.2SiO_2$), cristobalite ($SiO_2$), strontium (alum ino) silicates, nepheline, calsilite, mullite, etc.

Based on the crystal phase, the proportion of the foreign (crystal) phase should be very low since the foreign crystals can, inter alia, influence the thermal expansion and the Young's modulus of the glass-ceramic. The proportion of the foreign (crystal) phase is advantageously not more 10% by volume, preferably not more than 7.5% by volume, more preferably not more than 5% by volume, particularly preferably not more than 2.5% by volume.

Based on the glass-ceramic, the proportion of foreign (crystal) phases can advantageously be not more than 7.5% by volume, preferably not more than 5% by volume, more preferably not more than 2% by volume, particularly preferably not more than 1% by volume. One variant of the invention is free of foreign (crystal) phases.

The components of the composition are described in detail below. Here, the composition of the glass-ceramic corresponds to the composition of the green glass. In the thermal transformation of the green glass into the glass-ceramic, only the internal structure changes. The composition of green glass and glass-ceramic as indicated by chemical analysis is the same.

The inventive glass-ceramic or the green glass preferably has the following composition (in percent by weight on an oxide basis):

| | |
|---|---|
| $SiO_2$ | 45-62 |
| $Al_2O_3$ | 20-40 |
| MgO | 5-16 |
| $Li_2O$ | 0.3-6 |
| $TiO_2$ | 0-8 |
| $MoO_3$ | 0-2 |
| $ZrO_2$ | 0-4 |

The $SiO_2$ content should be at least 45% by weight, preferably at least 47% by weight, particularly preferably at least 50% by weight. This is necessary since $SiO_2$ functions firstly as glass former and secondly as constituent of the crystal phases cordierite and solid solution. The maximum content of $SiO_2$ is limited by the requirement of good meltability since the melting temperature also generally increases with increasing proportion of $SiO_2$. Contents up to a maximum of 62% by weight, but preferably only up to not more than 60% by weight, have been found to be advantageous. In some advantageous variants 61% by weight can be a preferred upper limit for $SiO_2$.

$Al_2O_3$ is likewise a constituent of the crystal phases cordierite and solid solution and should therefore be present in a proportion of at least 20% by weight, preferably at least 24% by weight, particularly preferably at least 26% by weight. An excessively high aluminium oxide content leads to a high tendency for devitrification to occur as a result of the formation of mullite and thus to problems in melting and/or shaping due to undesirable crystallization. The $Al_2O_3$ content should therefore be not more than 40% by weight, preferably not more than 35% by weight, particularly preferably not more than 32% by weight, even more preferably not more than 30% by weight. In an advantageous embodiment, the composition has an $Al_2O_3$ content of from 26 to 30% by weight.

The molar ratio of $Al_2O_3$ to $SiO_2$ should advantageously be at least 0.24, preferably at least 0.28. This ensures that the composition contains sufficient $Al_2O_3$ to make the formation of the crystal phases cordierite and keatite possible. The molar ratio of $Al_2O_3$ to $SiO_2$ should advantageously be not more than 0.38, preferably not more than 0.34. These upper limits are advantageous because there is then sufficient $SiO_2$ available for the formation of keatite. Compositions which have a proportion of $SiO_2$ which is too small contain a high proportion of high-quartz, which can have an adverse effect on the Young's modulus, after ceramization.

The magnesium content significantly determines the proportion of cordierite in the glass-ceramic. The magnesium oxide (MgO) content should therefore be at least 5% by weight, preferably at least 6% by weight, particularly preferably at least 8% by weight. However, an excessively high magnesium oxide content leads to formation of undesirable foreign crystal phases. While small amounts of these crystal phases can have positive effects on the properties of the glass-ceramic because of their high thermal conductivity and the high Young's modulus, larger amounts are undesirable since they can greatly increase the thermal expansion. For this reason, the magnesium oxide content is limited to not more than 16% by weight, preferably not more than 15% by weight, particularly preferably not more than 12% by weight.

The lithium oxide content can control the proportion of the secondary crystal phase in the glass-ceramic. If the proportion of $Li_2O$ is too high, the Young's modulus of the glass-ceramic decreases to the typical values for LAS glass-ceramics of 90-95 GPa, but on the other hand if the content is too low, the positive influence on the coefficient of thermal expansion does not occur. The lithium oxide ($Li_2O$) content should therefore be at least 0.3% by weight, preferably at least 0.4% by weight, more preferably at least 0.8% by weight. The upper limit should be not more than 6% by weight, preferably not more than 4.8% by weight, particularly preferably not more than 2.5% by weight. Particular preference is given to a lithium oxide content in the range from 0.8 to 2.5% by weight. This $Li_2O$ content ensures that the glass-ceramic contains a sufficient proportion of lithium solid solution.

In order to improve the Young's modulus and the thermal expansion compositions having a molar ratio of $MgO/Li_2O$ of >3.2 have been found to be advantageous.

For reasons of avoiding foreign (crystal) phases, the composition is preferably free of other alkali metals, i.e. $Na_2O$, $K_2O$, $Cs_2O$, $Rb_2O$.

Unless indicated otherwise, the expression "X-free" or "free of a component X" means that the glass essentially does not contain this component X, i.e. such a component is present at most as impurity in the glass but is not added as individual component to the glass composition. Here, X is any component (e.g. $Na_2O$). Small amounts as are introduced by impurities in the raw materials are not critical up to a maximum content of not more than 1% by weight, advantageously not more than 0.5% by weight, more preferably less than 0.1% by weight.

For the transformation of a green glass into a glass-ceramic, the composition advantageously contains crystallization nucleus formers or crystal nucleus formers or nucleating agents. The proportion of crystallization nucleus formers in the green glass ensures the formation of a sufficiently large number of nucleus crystallites or crystallization nuclei in the total volume of the precursor article, i.e. the green glass before ceramization.

The total content of crystallization nucleus formers is advantageously at least 1.5% by weight and/or not more than 9% by weight. A proportion of at least 1.5% by weight of crystallization nucleus formers, preferably at least 2.5% by weight, ensures the above-described formation of crystallization nuclei in a number sufficient for volume crystallization. At the same time, the total content of crystallization nucleus formers is sufficiently low to avoid premature crystallization during the production of the green glass and in order not to significantly change the advantageous physical properties of the glass-ceramic by means of these components.

In one embodiment, the total content of crystallization nucleus formers is limited to not more than 6% by weight. Due to the reduced proportion of crystallization nucleus formers in this variant, the proportion of secondary crystal phases attributable to crystallization nucleus formers can be reduced. The Young's modulus and coefficient of thermal expansion of the glass-ceramic formed can be improved.

In some advantageous variants, the total content of crystallization nucleus formers can advantageously be at least 0.1% by weight and/or not more than 5% by weight. An advantageous lower limit can also be 0.2% by weight or 0.5% by weight and/or an advantageous upper limit can also be 3% by weight, preferably 2% by weight, preferably 1% by weight.

In advantageous embodiments of the composition, at least $TiO_2$ is preferably present as crystallization nucleus former. As an alternative or in addition, $ZrO_2$, $SnO_2$, $Ta_2O_5$, $MoO_3$, $WO_3$ and/or $Nb_2O_5$ both individually and in combination of two or more can be used as crystallization nucleus formers. Compositions which contain only $TiO_2$ as crystallization nucleus former are preferred in some variants. The nucleus crystallites formed are, in particular, rutile, $MgTi_2O_5$ and/or $ZrTiO_4$ crystallites which are homogeneously distributed in the precursor article. Such a glass-ceramic according to the invention thus generally has small proportions of rutile, $MgTi_2O_5$ and/or $ZrTiO_4$ as constituents of the secondary crystal phase due to the addition of the crystallization nucleus formers.

The composition preferably contains $TiO_2$. The $TiO_2$ content should be not more than 8% by weight, preferably not more than 6.8% by weight, particularly preferably not more than 5% by weight since otherwise excessively large amounts of Mg titanate crystals can be formed during ceramization, which can have an adverse effect on the expansion behaviour of the glass-ceramic. The lower limit for $TiO_2$ can be at least 1.0% by weight, preferably at least 1.5% by weight, more preferably at least 2% by weight. Particular preference is given to a $TiO_2$ content of from 1.5 to 5% by weight. Some advantageous variants of the glass-ceramic can be $TiO_2$-free or contain at least 0.1% by weight, advantageously at least 0.5% by weight, of $TiO_2$.

The $ZrO_2$ content should be limited to not more than 4% by weight since higher contents can lead to an increased devitrification tendency. For this reason, it has been found to be advantageous, according to one variant of the invention, to use not more than 3% by weight, preferably less than 2% by weight, of $ZrO_2$ and/or preferably at least 0.1% by weight, more preferably at least 0.5% by weight. However, $ZrO_2$-free compositions are likewise possible.

Although $Ta_2O_5$ and $Nb_2O_5$ can also be used as crystallization nucleus formers, their content is generally limited by economic considerations because of the high price thereof. However, depending on the requirements of the application, the use of in each case not more than 10% by weight, preferably not more than 8% by weight, is possible. If $Ta_2O_5$ and/or $Nb_2O_5$ are present, the respective content thereof is at least 0.1% by weight, preferably at least 0.5% by weight.

$MoO_3$ can be used either alone or in combination with other components (for example with $SnO_2$) as crystallization nucleus former. The use of $MoO_3$ as crystallization nucleus former is advantageous since the amorphous proportion in the glass-ceramic can be minimized. Furthermore, the formation of undesired crystal phases (for example needles of rutile) can be prevented. If it is present, it is present in an amount of at least 0.1% by weight, preferably at least 0.2% by weight, further preferably at least 0.5% by weight. An upper limit of 2% by weight should not be exceeded because otherwise the amorphous proportion raises significantly. An advantageous upper limit of $MoO_3$ can also be 1.5% by weight, preferably 1% by weight, also preferably 0.8% by weight, preferably 0.6% by weight. Corresponding advantageous upper and lower limits also apply to $WO_3$ as crystallization nucleus former. Composition variants which are free of $MoO_3$ and/or $WO_3$ are possible.

$SnO_2$ can not only perform the function of crystallization nucleus former but also assist refining of the glass. However, excessively high $SnO_2$ contents have an adverse effect on the devitrification stability. Proportions of not more than 5% by weight of $SnO_2$ have been found to be appropriate. An advantageous upper limit for that component can be 4% by weight, preferably 3% by weight, also preferably 2% by weight. If $SnO_2$ is present, it is present in a proportion of at least 0.05% by weight, preferably of at least 0.1% by weight, also preferably of at least 0.2% by weight, more preferably at least 0.5% by weight. Variants of the invention can also be $SnO_2$-free.

Apart from $SnO_2$, $CeO_2$ can also assist refining. At the same time, small additions of $CeO_2$ improve the glass stability. However, in order to avoid formation of foreign (crystal) phases, not more than 5% by weight should be used. If $CeO_2$ is present, it is present in a proportion of at least 0.1% by weight, preferably at least 0.5% by weight. However, variants of the invention are $CeO_2$-free.

Since, particularly for lithographic applications, a high homogeneity of the material and a low bubble number are required, one or more classical refining agents such as $As_2O_3$, $Sb_2O_3$ and/or sulphate can be used in usual amounts, i.e. preferably at least 0.1% by weight and/or preferably not more than 2% by weight, if required. From an environmental point of view, refining using $SnO_2$, $CeO_2$ or sulphate is preferred. As an alternative, physical refining (e.g. by gas bubbling) can also be used.

ZnO and the alkaline earth metal oxides CaO, SrO, BaO can be used up to a content of in each case not more than 10% by weight in order to improve the meltability. This upper limit arises from the requirement for avoiding foreign (crystal) phases.

$B_2O_3$ and $P_2O_5$ have been found to be advantageous for modifying the viscosity of the melt. Both components increase the glass stability and reduce the devitrification tendency. However, the proportions should be not more than 8% by weight in the case of $B_2O_3$ and/or not more than 10% by weight in the case of $P_2O_5$ since otherwise an increase in the thermal expansion is observed. If $B_2O_3$ and/or $P_2O_5$ are present, the respective proportion thereof is at least 0.1% by weight, preferably at least 0.5% by weight.

As further components, it is possible to use $La_2O_3$, $Y_2O_3$, $Fe_2O_3$, $Cr_2O_3$ and/or $Ln_2O_3$ in a proportion of in each case not more than 10% by weight, preferably in each case not more than 5% by weight. These components can, in particular, have a positive influence on the Young's modulus and are partly incorporated into the cordierite crystal. If one or more of these components are present, the respective proportion thereof is at least 0.01% by weight, preferably in each case at least 0.5% by weight. Here, "Ln" generally represents the lanthanoids with the exception of lanthanum and cerium, which are singled out above.

The glass-ceramic according to the invention is white and opaque after ceramization. However, coloured glass-ceramics can also be obtained by addition of colour-imparting constituents to the appropriate green glass. Glass-ceramics having a blue, grey or yellowish brown colour can be obtained by, for example, addition of colouring oxides such as CoO, NiO, $MoO_3$, $V_2O_5$, $SeO_2$ and/or $PtO_2$ to the green glass. In an embodiment of the invention, the glass-ceramic is therefore obtained by ceramization of a green glass which contains one or more oxides selected from the following group (in % by weight):

| | |
|---|---|
| CuO | 0.01-5.0, preferably not more than 1.0 |
| MnO | 0.01-5.0, preferably not more than 1.0 |
| CoO | 0.01-5.0, preferably not more than 1.0 |
| NiO | 0.01-0.8 |
| $MoO_3$ | 0.01-0.1 |
| $V_2O_5$ | 0.01-0.1 |
| $SeO_2$ | 0.01-0.5 |
| $PtO_2$ | 0.01-0.1 |

The ranges indicated relate to the total composition. When colour-imparting ions are present, the total proportion of these is advantageously at least 0.01% by weight and/or not more than 5% by weight. Uncoloured glass-ceramics are also possible. The composition is then free of colour-imparting components.

In one embodiment according to the present invention, the glass-ceramic of the invention or the green glass preferably comprises at least 90% by weight, more preferably at least 95% by weight, most preferably up to 99% by weight, of the abovementioned components or preferably the components $SiO_2$, $Al_2O_3$, MgO, $Li_2O$, $TiO_2$ and $ZrO_2$.

In an alternative embodiment according to the present invention, the glass-ceramic of the invention or the green glass preferably comprises at least 90% by weight, more preferably at least 95% by weight, most preferably 99% by weight, of the abovementioned components or preferably the components $SiO_2$, $Al_2O_3$, MgO, $Li_2O$ and $MoO_3$.

As indicated above, the freedom from cavities plays a central role in precision applications. The porosity should be as low as possible, advantageously less than 2%, preferably less than 1%, more preferably less than 0.5%, particularly preferably less than 0.1%. The porosity was determined by means of scanning electron micrographs. Essentially no pores are to be found on these micrographs. The porosity is defined as the ratio of pore volume to the total volume of the glass-ceramic.

At the same time, the number of bubbles and inclusions should be less than 5 per 100 cm³, preferably <3 per 100 cm³. Here, bubbles and inclusions are all glass defects having a diameter of >0.3 mm, preferably >0.1 mm.

In an advantageous embodiment of the invention, the glass-ceramic has a coefficient of thermal expansion CTE or α of not more than 0.8 ppm/K in the temperature range from 0° C. to 50° C., where the temperature range can also be reported in the notation (0;50), and/or in the temperature range from 20° C. to 25° C. (corresponding to (20;25)). The coefficient of thermal expansion reported for such a temperature range is reported as CTE (0;50) or α(0;50). In this way, a material by means of which the high accuracy requirements in technical applications can be satisfied is provided. "ppm/K" here corresponds to the unit "$10^{-6}$/K" also frequently used in connection with the description of the thermal expansion.

The above reported values are the average CTE. An "average CTE" is understood to be the average of all CTE measurements which were carried out at various places on a glass-ceramic specimen. The average CTE is usually reported for the temperature range from 0 to 50° C. (CTE (0;50)). However, the average CTE can also be reported for other temperature ranges. For high-precision applications, the average CTE is reported in a significantly narrower temperature range around the later application temperature, for example a CTE(20;25) for microlithography components. As described below, the average CTE can also be reported for a particular application temperature $T_A$.

The average CTE for a temperature range can be determined by means of the equation (1) below:

$$CTE[t_0;t]=(1/l_0)\times(l_t-l_0)/(t-t_0)=\Delta l/(l_0\times\Delta t) \quad (1)$$

where $t_0$ is the initial temperature, t is the measurement temperature, $l_0$ is the test specimen length at the initial temperature $t_0$, $l_t$ is the test specimen length at the measurement temperature t and $\Delta l$ is the corrected length change of the test specimen at the temperature change $\Delta t$.

To determine the average CTE, the length of a test specimen of a glass-ceramic is measured at the initial temperature $t_0$, the test specimen is heated to a second temperature t and the length $l_t$ at this temperature is measured. The abovementioned formula (1) gives the average CTE $[t_0; t]$ for the temperature range from $t_0$ to t. The determination of the thermal expansion can be carried out by means of dilatometry, i.e. determination of the length change of a test specimen as a function of temperature. A measurement apparatus for determining the average CTE is described, for example, in R. Mueller, K. Erb, R. Haug, A. Klaas, O. Lindig, G. Wetzig: "Ultraprecision Dilatometer System for Thermal Expansion Measurements on Low Expansion Glasses", 12th Thermal Expansion Symposium, Pittsburgh/Pa., P. S. Gaal and D. E. Apostolescu Eds., 1997, the contents of which are fully incorporated by reference into the present application.

The thermal expansion is an important property for the later application of the glass-ceramic.

Firstly, the average coefficient of thermal expansion α should preferably be ≤0.8 ppm/K, preferably ≤0.5 ppm/K, preferably ≤0.2 ppm/K, more preferably ≤0.1 ppm/K, particularly preferably ≤0.02 ppm/K, even more preferably ≤0.01 ppm/K. In general, the thermal expansion is reported for the temperature range of 0 to 50° C. (0;50), i.e. as $\alpha_{(0;50)}$. However, depending on the type of application, the requirements in respect of the thermal expansion can be more specific and apply to the temperature range from 20 to 25° C. (i.e. $\alpha_{(20;25)}$). In lithographic applications, work is generally carried out in a temperature range around 22° C., i.e. in the temperature range 22° C. (+/−2° C., preferably +/−1° C.). The expansion of the substrate used should therefore be minimized in this range.

Since the "true CTE" at a particular temperature can be falsified by looking at the average CTE in a wider temperature range, in the context of the invention the "differential CTE" is determined as a function of the temperature (dynamic measurement method). The "differential CTE" at a particular temperature is the value lying on a CTE-T curve at this temperature. The CTE(T) is then defined according to the formula (2) below:

$$CTE(T)=(1/l_0)\times(\partial l/\partial T) \quad (2)$$

Figure 2:
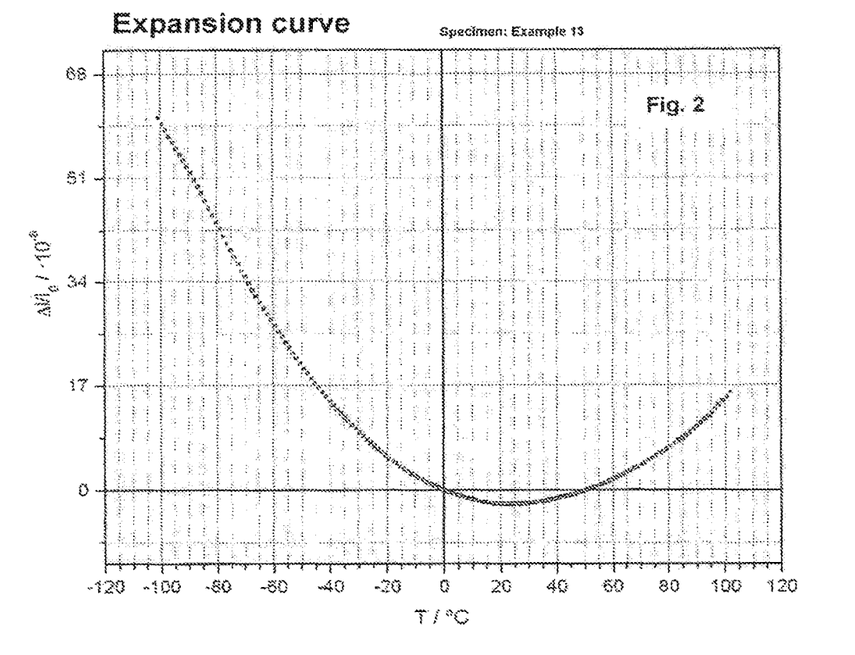
FIG. 2 shows an expansion curve of Working Example 13, FIG. 3 an expansion curve of Working Example 14 and FIG. 4 an expansion curve of Working Example 15.
Figure 3:
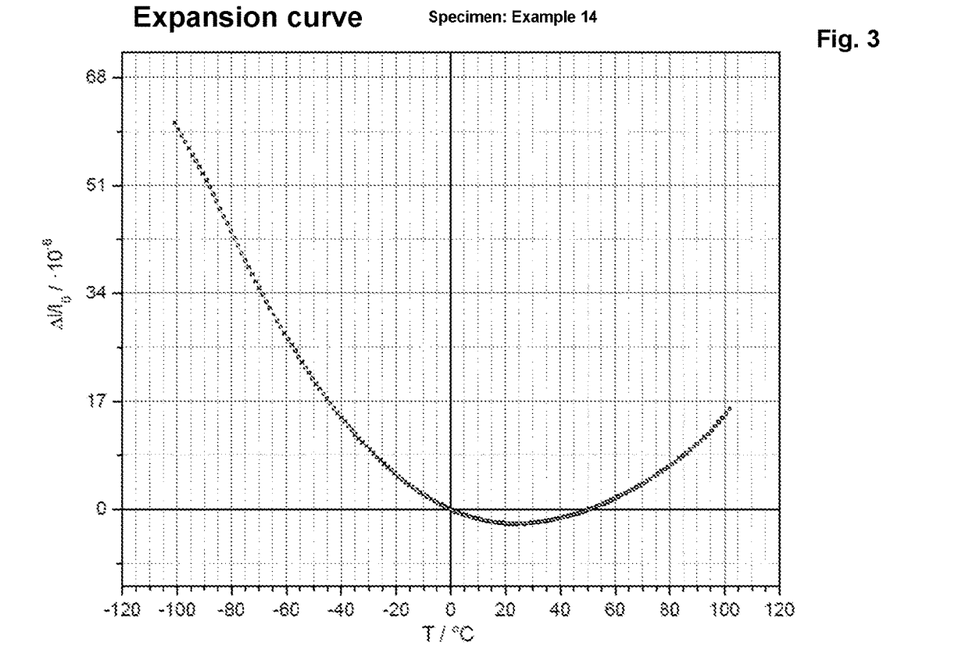
Figure 4:
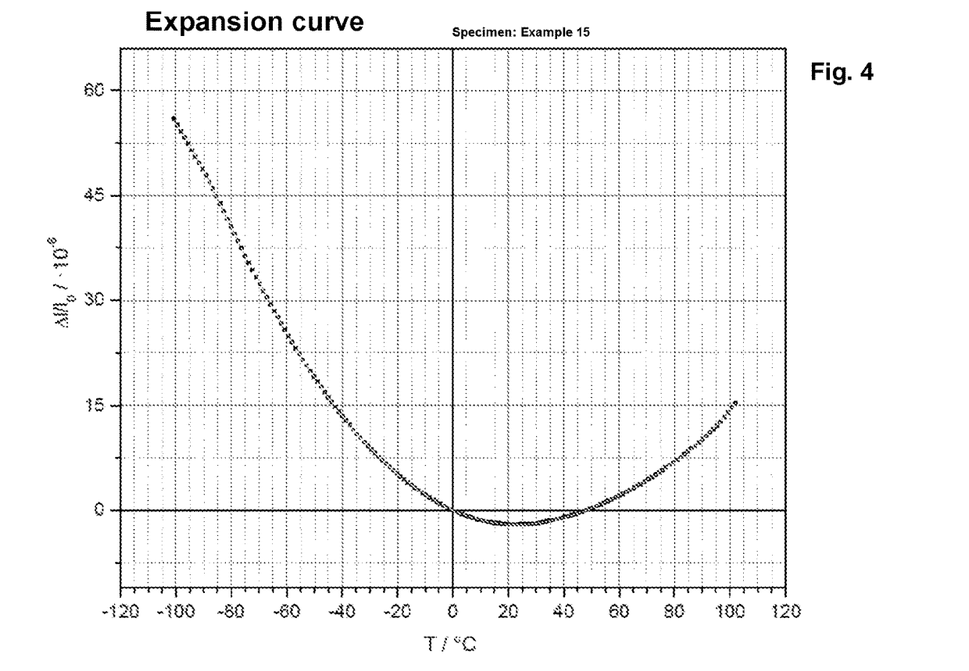

To produce a $\Delta l/l_0$-T curve or an expansion curve or to plot the length change $\Delta l/l_0$ of a test specimen versus the temperature, the temperature-dependent length change in the length of the test specimen from the initial length $l_0$ at the initial temperature $t_0$ to the length $l_t$ at the temperature t can be measured. Here, small temperature intervals of, for example, 5° C. or 3° C. are preferably selected for determining a measurement point. FIGS. 2 to 4 show $\Delta l/l_0$-T curves of glass-ceramics according to the invention.

Such measurements can, for example, be carried out by dilatometric methods, interferometric methods, for example the method of Fabry-Perot, i.e. evaluation of the shift of the resonance peak of a laser beam injected into the material, or other suitable methods. The average CTE for the temperature range selected can be calculated from the measured values in a chosen temperature range.

The chosen method for determining the $\Delta l/l_0$-T measurement points preferably has an accuracy of preferably at least ±0.10 ppm, more preferably ±0.05 ppm, most preferably ±0.01 ppm, according to some embodiments even ±0.005 ppm.

A CTE-T curve which oscillates around the zero line can simulate a low average CTE while the "differential CTE" can at the specific application temperature lie outside the specifications.

A further important property for the later application of the glass-ceramic is the zero crossing of the CTE-T curve. To determine the zero crossing of the CTE-T curve, the differential CTE(T) as a function of the temperature is generally firstly determined according to formula (2).

A CTE-T curve is obtained by differentiation of the $\Delta l/l_0$-T curve. From the CTE-T curve, it is possible to determine the zero crossing, the gradient of the CTE-T curve and also the average thermal expansion within a temperature range.

The course of the CTE/T curve of the glass-ceramic according to the invention displays in an advantageous embodiment a zero crossing in the temperature range from −20° C. to 50° C. ($T_{(-20;50)}$), preferably in the temperature range from −10° C. to 50° C. ($T_{-10;50}$), more preferably in the temperature range from −8° C. to 50° C. ($T_{(-8;50)}$). The CTE/T curve is the first derivative of the $(\Delta l/l_0)/T$ curve. A minimum and/or maximum in the $(\Delta l/l_0)/T$ curve is known to lead to a zero crossing of the corresponding CTE/T curve. In one embodiment of the invention, this zero crossing is in the range of the later application temperatures, preferably in the range 0 to 50° C., particularly preferably in the range 20 to 25° C., in one embodiment in the range 22° C.+/−10° C., preferably in the range 22° C.+/−5° C., more preferably in the range 22° C.+/−2° C., also preferably in the range 22° C.+/−1° C. In an alternative advantageous low-temperature variant of the invention, the zero crossing is in the range of the later application temperatures, preferably in the range from −20 to 0° C., preferably in the range from −10 to 0° C., particularly preferably from −8 to 0° C.

It is surprisingly found that the addition of lithium oxide to cordierite glass-ceramics and thus the production of a glass-ceramic which contains lithium solid solution as secondary crystal phase in addition to the main crystal phase cordierite not only has a positive effect on the value of the thermal expansion but also shifts the zero crossing of the CTE curve from negative temperatures in pure cordierite glass-ceramics (e.g. −30° C.) to less negative temperatures up to positive temperatures, e.g. into the desired, in some variants, temperature range of 0 to 50° C. or 20 to 25° C. or in the case of the low-temperature variant into the temperature range of −20 to 0° C. or −10 to 0° C. or −8 to 0° C.

Apart from the thermal expansion, the thermal conductivity also influences the behaviour of the glass-ceramic in use. A high thermal conductivity is advantageous since the heat can be passed more quickly to the environment. The thermal conductivity is at least 1.5 W/(K×m), preferably at least 2.5 W/(K×m). The ratio of thermal conductivity to CTE should accordingly be as large as possible and should preferably be at least $3 \times 10^6$ W/m, particularly preferably at least $5 \times 10^6$ W/m.

A high Young's modulus (E modulus), which is a measure of the mechanical stability of a glass-ceramic, is likewise achieved in the case of the glass-ceramic according to the invention. An advantageous embodiment of the glass-ceramic is characterized by a high Young's modulus of at least 100 GPa. In an advantageous embodiment, the Young's modulus can be at least 112 GPa, preferably at least 120 GPa, particularly preferably at least 125 GPa. This property ensures a satisfactory mechanical stability. The maximum Young's modulus can advantageously be 180 GPa.

In the case of moving components, the specific Young's modulus, i.e. the ratio of Young's modulus to density, also plays a significant role. The density of the glass-ceramic is advantageously in the range from 2.4 to 2.8 g/cm$^3$. The specific Young's modulus is preferably at least 40 GPa×cm$^3$/g, particularly preferably at least 45 GPa×cm$^3$/g. It can advantageously be a maximum of 75 GPa×cm$^3$/g.

In some embodiments, the glass-ceramics according to the invention are additionally characterized by low dielectric constants (typically in the range from 5 to 8 in the GHz range) and good insulation properties (specific resistance at room temperature typically $>10^{12}$ Ωcm, preferably $>10^{14}$ Ωcm).

The above properties can be satisfied either individually or in a combination of two or more properties by a glass-ceramic according to the invention.

One of the advantages of the glass-ceramic according to the invention is the workability which is improved in comparison with sintered ceramics. Since the crystallites (typically having a small size of up to 100 nm) are embedded in the glass phase in the glass-ceramic, the polishing properties are generally better than those of a comparable ceramic. This is particularly relevant for lithographic applications or in use as mirror supports, since particularly low surface roughnesses (of up to $R_A$<0.5 μm RMS) are required here.

The invention further provides a glass-ceramic component, preferably having a low coefficient of thermal expansion α or CTE, i.e. a component which is made of a glass-ceramic according to the invention.

The glass-ceramic component according to the invention can advantageously be a component or support part or an optical component in a lithographic process (LCD lithography, microlithography).

Furthermore, the glass-ceramic can advantageously be used as constituent of precision optics or mechanical or optical measurement instruments, of laser gyroscopes or of positioning mechanics or as telescope mirror support.

Due to the high thermal conductivity of at least 1.5 W/(K×m), preferably at least 2.5 W/(K×m), and the good heat resistance up to 1200° C., the glass-ceramic can be used as constituent of high-temperature components such as nozzles, heat exchangers, turbines, recuperators, carbon particulates filters, furnace linings, catalyst substrates, etc.

Owing to the abovementioned low dielectric constant and the good insulation properties, the glass-ceramic according to the invention is suitable for use as substrate, in particular for electronic components, or as housing for electronic components.

Further possible applications of the glass-ceramics according to the invention include cooking plates and/or keeping-warm plates.

The invention also provides for the use of the glass-ceramic component according to the invention in astronomy, for example as mirror support for segmented or monolithic astronomic telescopes or lightweight or ultralight mirror substrates for, for example, space-mounted telescopes or optics for observation of the earth, as precision components such as standards for precision measurement technology, mechanical precision parts, e.g. for ring laser gyroscopes, spiral springs for the watch and clock industry, in LCD lithography, for example as mirror and prisms, and also in microlithography, for example as mask holders, wafer stages and reference plates.

The invention also provides for the use of a glass-ceramic according to the invention and/or a component according to the invention in one of the above-described applications.

The invention further provides a process for producing the glass-ceramic, wherein a green glass produced by melting is converted by means of a controlled heat treatment (ceramization) into a glass-ceramic. One or more further after-processing steps such as sawing, cutting, grinding, polishing or if required coating can follow.

In particular, the invention provides a process for producing a glass-ceramic, which comprises the steps of:
melting and casting a green glass containing $SiO_2$, $Al_2O_3$, MgO and $Li_2O$,
allowing the green glass to solidify,
heating the green glass to a temperature T above the ceramization temperature and holding at this temperature T for a period of time and as a result converting the green glass into a glass-ceramic having cordierite as main crystal phase and high-quartz solid solution and/or keatite solid solution as secondary crystal phase and
cooling the glass-ceramic.

The production of the glass-ceramic of the invention is carried out via the melting route. After melting, typically at 1500-1650° C., and homogenization of the green glass and optionally a separate refining step, the glass is poured into a mould or processed further by means of another shaping method known from the glass industry and subsequently cooled. Cooling is carried out down to the region of the glass transition temperature $T_g$ so quickly that crystallization in the green glass is avoided and subsequently carried out down to room temperature sufficiently slowly for the formation of stresses in the glass to be avoided.

In some variants, it can be advantageous to melt the mixtures under reducing conditions, for example by "bubbling" with, for example, a forming gas, Ar-gas or by addition of carbon-containing components (for example sugar).

The green glass obtained in this way is transparent, which allows simple visual inspection to evaluate the glass quality (in particular homogeneity, freedom from bubbles, monitoring of inclusions, pores, etc.).

An advantage of the glass-ceramic compared to a ceramic is that working of a component can be carried out in the vitreous state before ceramization. Since the main crystal phase cordierite has a Mohs hardness of 7-7.5 and the hardness of glass is generally significantly below this (5-6), this can significantly assist after-processing, shaping, polishing, etc.

To effect ceramization, the green glass is heated to a temperature T above the ceramization temperature and held at this temperature T for a period of time and is thus transformed into a glass-ceramic having cordierite as main crystal phase and high-quartz solid solution and/or keatite solid solution as secondary crystal phase. The temperature T is preferably at least 950° C., more preferably at least 1000°

C., and/or preferably not more than 1300° C. The hold time at the temperature T is preferably at least 1 hour, preferably at least 6 hours. The hold time is dependent on the volume of the green glass component to be ceramicized, with longer hold times being required for larger pieces. Further hold times at other temperatures can be inserted into the programme. Thus, it is known that Mg-β-quartz is firstly formed as precursor phase before the desired main crystal phase cordierite is formed. The ceramization programme can contain a hold time or a low heating rate in the region of formation of this crystal phase in order to avoid formation of stresses as a result of crystallization. An analogous situation applies to the formation of high-quartz solid solutions which serve as precursor phase for keatite solid solution formation. Hold times for improving nucleus formation in the temperature range from $T_g$ to commencement of crystallization can also be inserted to improve nucleus formation.

Production via the melting route allows, compared to ceramics, the production of larger and in particular thicker components. Thus, it is possible, for example, to produce plates having a size of at least 30 cm×30 cm, advantageously at least 50 cm×50 cm, preferably at least 85 cm×85 cm, more preferably at least 100 cm×100 cm, particularly preferably at least 150 cm×150 cm. It is also possible, for example, to produce sizes up to 1000 cm×1000 cm. Of course, other component shapes having other base areas are also possible, for example rectangular, polygonal, circular, oval, etc. The thickness of the components can be matched to the respective uses. The thickness can advantageously be in the range from 0.5 mm to 40 cm and can be, for example, 1 cm, 2 cm, 5 cm, 7.5 cm, 10 cm, 20 cm, 40 cm. Of course, larger and/or smaller thicknesses can also be achieved.

Apart from sawing or cutting and polishing, the after-processing can also encompass a coating step.

In the case of large components, it can be advantageous to provide hollow spaces to save weight. The glass-ceramic according to the invention can be used for producing these lightweight structures. Lightweight shaping or preliminary shaping can advantageously be carried out on the less hard green glass body.

The present invention will be illustrated below by a series of examples. However, the present invention is not limited to the examples mentioned.

EXAMPLES

The green glasses having the compositions shown in Tables 1 to 3 were melted and refined at temperatures of 1500-1650° C. using raw materials customary in the glass industry. The mixture was melted in Pt/Rh crucibles, optionally with inner crucibles composed of fused silica, and homogenized at temperatures of about 1580° C. for 30 minutes by stirring. After being allowed to stand at 1600° C. for 2 hours, cast pieces of various sizes were cast and annealed in a cooling furnace at a temperature somewhat below $T_g$ and cooled to room temperature. The test specimens for measurement of the properties in the vitreous state ($T_g$, Va, ρ) and for ceramization were prepared from the cast pieces.

For ceramization, the specimens were ceramicized at a maximum temperature of 1180-1250° C. for 4-20 hours. The thermal expansion, the Young's modulus, Poisson's ratio and the density of the glass-ceramic were determined on the specimens obtained in this way.

The thermal expansion was measured by a method based on DIN 51045-1. In the dynamic determination of the thermal length change, the test specimens are heated up continuously. The length change brought about by this is measured under computer control by determining and storing the value pairs for length $L_i$ and temperature $T_i$ at the prescribed time steps. In this way, the expansion behaviour of a body in a temperature interval is described and determination of coefficients of expansion for subintervals is made possible.

The density was determined by the classical buoyancy method, in accordance with DIN 66137-1, issue: 2003-11 ASTM C 693, issue: 1993-11, reapproved 2008.

The Young's modulus and Poisson's ratio were determined by means of the ultrasonic measurement technique. Here, the travel time of an ultrasonic pulse in a plane-parallel specimen, which pulse is reflected at the rear side of the specimen, is measured. The elastic constants are determined from the measurement of longitudinal wave speed and transverse wave speed:

$$\text{Longitudinal wave speed } v_L = \sqrt{\frac{E \cdot (1-v)}{\rho \cdot (1-2 \cdot v)(1+v)}}$$

$$\text{Transverse wave speed } v_T = \sqrt{\frac{E}{2 \cdot \rho \cdot (1+v)}}$$

ρ: Density of the material

E: Young's modulus of the material v: Poisson's ratio of the material

In the following tables, secondary crystal phases (with the exception of keatite solid solution and high-quartz solid solution, which are indicated separately) and foreign crystal phases are subsumed under "other crystal phases". Comparative Example 1 contains spinel as foreign crystal phase.

TABLE 1

Compositions of green glasses/glass-ceramics and properties

|  | Ex. 1 | | Ex. 2 | | Ex. 3 | | Ex. 4 | |
| --- | --- | --- | --- | --- | --- | --- | --- | --- |
|  | wt. % | mol % | wt. % | mol % | wt. % | mol % | wt. % | mol % |
| $Al_2O_3$ | 30.9 | 20.0 | 31.4 | 20.0 | 28.2 | 18.0 | 28.4 | 18.0 |
| $Li_2O$ | 0.9 | 2.0 | 1.4 | 3.0 | 0.9 | 2.0 | 0.9 | 2.0 |
| MgO | 11.0 | 18.0 | 11.2 | 18.0 | 11.2 | 18.0 | 12.5 | 20.0 |
| $SiO_2$ | 49.2 | 54.0 | 49.9 | 54.0 | 51.7 | 56.0 | 50.2 | 54.0 |
| $TiO_2$ | 6.1 | 5.0 | 6.2 | 5.0 | 6.1 | 5.0 | 6.2 | 5.0 |
| $ZrO_2$ | 1.9 | 1.0 |  |  | 1.9 | 1.0 | 1.9 | 1.0 |
| $T_g$ [° C.] | 737 | | 718 | | 731 | | 728 | |
| $10^4$ dPas [° C.] | 1137 | | 1138 | | 1147 | | 1129 | |
| $10^{13}$ dPas [° C.] | 740 | | 724 | | 738 | | 735 | |

TABLE 1-continued

Compositions of green glasses/glass-ceramics and properties

| | | | | |
|---|---|---|---|---|
| Max. ceramization temp. [° C.] | 1200 | 1200 | 1200 | 1200 |
| Density, vitreous [g/cm³] | 2.67 | 2.63 | 2.64 | 2.67 |
| Density, ceram. [g/cm³] | 2.56 | 2.55 | 2.59 | 2.59 |
| CTE(0; 50) [ppm/K] | 0.16 | 0.2 | 0.15 | 0.18 |
| CTE(20; 25) [ppm/K] | 0.15 | 0.17 | 0.13 | 0.15 |
| Zero crossing of CTE/T curve [° C.] | −5 | −8 | −5 | −5 |
| Young's modulus [GPa] | 132 | 132 | 132 | 133 |
| Poisson's ratio | 0.307 | 0.312 | 0.308 | 0.305 |
| Spec. Young's modulus [GPa × cm³/g] | 51.57 | 51.72 | 51.05 | 51.35 |
| Proportion of amorphous material [% by vol.] | 25 | 22.2 | 20.1 | 22.2 |
| Proportion of cordierite [% by vol.] | 64.6 | 63.0 | 62.8 | 62.1 |
| Proportion of keatite [% by vol.] | 7.6 | 14.2 | 13.7 | 10.7 |
| Proportion of high-quartz [% by vol.] | 0 | 0 | 0 | 0 |
| Other crystal phases [% by vol.] | 2.8 ($TiO_2$, $ZrTiO_4$) | 0.6 ($TiO_2$) | 3.4 ($TiO_2$, $ZrTiO_4$) | 5.0 ($TiO_2$, $ZrTiO_4$, $MgTi_2O_4$) |

| | Ex. 5 | | Ex. 6 | | Ex. 7 | | Ex. 8 | |
|---|---|---|---|---|---|---|---|---|
| | wt. % | mol % | wt. % | mol % | wt. % | mol % | wt. % | mol % |
| $Al_2O_3$ | 27.4 | 17.4 | 25.7 | 16.2 | 24.2 | 15.0 | 28.3 | 17.7 |
| $Li_2O$ | 1.4 | 3.1 | 1.9 | 4.0 | 1.6 | 3.3 | 2.3 | 5.0 |
| MgO | 8.9 | 14.3 | 7.6 | 12.1 | 10.0 | 15.7 | 9.7 | 15.5 |
| $SiO_2$ | 56.1 | 60.3 | 58.6 | 62.7 | 57.9 | 61.0 | 53.4 | 56.8 |
| $TiO_2$ | 6.2 | 5.0 | 6.2 | 5.0 | 6.3 | 5.0 | 6.3 | 5.0 |
| $T_g$ [° C.] | 715 | | 704 | | 722 | | 708.2 | |
| $10^4$ dPas [° C.] | 1175 | | 1191 | | n.d. | | n.d. | |
| $10^{13}$ dPas [° C.] | 723 | | 713 | | n.d. | | n.d. | |
| Max. ceramization temp. [° C.] | 1200 | | 1200 | | 1200 | | 1200 | |
| Density, vitreous [g/cm³] | 2.57 | | 2.53 | | 2.53 | | 2.53 | |
| Density, ceram. [g/cm³] | 2.54 | | 2.53 | | 2.53 | | 2.53 | |
| CTE(0; 50) [ppm/K] | 0.11 | | 0.16 | | 0.05 | | 0.16 | |
| CTE(20; 25) [ppm/K] | 0.1 | | 0.13 | | 0.04 | | 0.14 | |
| Zero crossing of CTE/T curve [° C.] | +6 | | −7 | | 15 | | 0 | |
| Young's modulus [GPa] | 117 | | 112 | | 105 | | 120 | |
| Poisson's ratio | 0.288 | | 0.292 | | 0.253 | | 0.306 | |
| Spec. Young's modulus [GPa × cm³/g] | 46.09 | | 44.33 | | 41.45 | | 47.41 | |
| Proportion of amorphous material [% by vol.] | 13.9 | | n.d. | | 17 | | | |
| Proportion of cordierite [% by vol.] | 56.7 | | n.d. | | 48.1 | | 48.9 | |
| Proportion of keatite [% by vol.] | 27.3 | | n.d. | | 24.9 | | 30.1 | |
| Proportion of high-quartz [% by vol.] | 0 | | n.d. | | 5.8 | | 0 | |
| Other crystal phases [% by vol.] | 2.1 ($TiO_2$) | | n.d. | | 4.2 ($MgTi_2O_4$, $TiO_2$) | | 4.6 ($MgTi_2O_4$) | |

| | Ex. 9 | | Ex. 10 | | Ex. 11 | | Ex. 12 | |
|---|---|---|---|---|---|---|---|---|
| | wt. % | mol % | wt. % | mol % | wt. % | mol % | wt. % | mol % |
| $Al_2O_3$ | 27.6 | 17.3 | 29.7 | 18.8 | 28.1 | 17.8 | 30.2 | 19.3 |
| $Li_2O$ | 1.4 | 3.0 | 1.4 | 3.0 | 1.4 | 3.0 | 1.4 | 3.0 |
| MgO | 11.4 | 18.0 | 11.3 | 18.0 | 10.0 | 16.0 | 9.9 | 16.0 |
| $SiO_2$ | 53.4 | 56.7 | 51.5 | 55.2 | 54.3 | 58.2 | 52.4 | 56.7 |
| $TiO_2$ | 6.3 | 5.0 | 6.2 | 5.0 | 6.2 | 5.0 | 6.1 | 5.0 |
| $T_g$ [° C.] | n.d. | | n.d. | | 730 | | 730 | |
| $10^4$ dPas [° C.] | n.d. | | n.d. | | n.d. | | n.d. | |
| $10^{13}$ dPas [° C.] | n.d. | | n.d. | | n.d. | | n.d. | |
| Max. ceramization temp. [° C.] | 1230 | | 1230 | | 1200 | | 1200 | |
| Density, vitreous [g/cm³] | n.d. | | n.d. | | n.d. | | n.d. | |
| Density, ceram. [g/cm³] | 2.55 | | 2.55 | | 2.55 | | 2.55 | |
| CTE(0; 50) [ppm/K] | 0.21 | | 0.16 | | 0.12 | | 0.17 | |

TABLE 1-continued

Compositions of green glasses/glass-ceramics and properties

| | | | | |
|---|---|---|---|---|
| CTE(20; 25) [ppm/K] | 0.19 | 0.153 | 0.124 | 0.153 |
| Zero crossing of CTE/T curve [° C.] | −7.5 | −3 | 5 | −3 |
| Young's modulus [GPa] | 125 | 130 | 124 | 128 |
| Poisson's ratio | 0.301 | 0.312 | 0.299 | 0.304 |
| Spec. Young's modulus [GPa × cm$^3$/g] | 49.03 | 51.00 | 48.72 | 50.26 |
| Proportion of amorphous material [% by vol.] | 18.8 | 18 | 17.4 | 19.7 |
| Proportion of cordierite [% by vol.] | 56.9 | 61.7 | 57.5 | 61.9 |
| Proportion of keatite [% by vol.] | 20.0 | 16.0 | 21.9 | 16.7 |
| Proportion of high-quartz [% by vol.] | 0 | 0 | 0 | 0 |
| Other crystal phases [% by vol.] | 4.3 (MgTi$_2$O$_4$) | 4.3 (MgTi$_2$O$_4$) | 3.2 (MgTi$_2$O$_4$, TiO$_2$) | 1.7 (TiO$_2$) |

| | Ex. 13 | | Ex. 14 | | Ex. 15 | | Ex. 16 | |
|---|---|---|---|---|---|---|---|---|
| | wt. % | mol % | wt. % | wt. % | mol % | mol % | wt. % | mol % |
| Al$_2$O$_3$ | 28.9 | 18.1 | 27.8 | 27.9 | 28.1 | 17.7 | 27.9 | 17.5 |
| Li$_2$O | 1.4 | 3.1 | 1.6 | 1.6 | 1.5 | 3.1 | 1.6 | 3.4 |
| MgO | 10.3 | 16.3 | 9.9 | 10.0 | 9.2 | 14.6 | 10.0 | 15.8 |
| SiO$_2$ | 55.7 | 59.5 | 57.0 | 57.4 | 57.5 | 61.5 | 57.4 | 60.9 |
| TiO$_2$ | 3.7 | 3.0 | 3.7 | 3.1 | 3.8 | 3.1 | 3.1 | 2.5 |
| ZrO$_2$ | | | | | | | | |
| T$_g$ [° C.] | 741 | | 741 | | 746 | | 736 | |
| 10$^4$ dPas [° C.] | n.d. | | n.d. | | n.d. | | 1188 | |
| 10$^{13}$ dPas [° C.] | n.d. | | n.d. | | n.d. | | 731 | |
| Max. ceramization temp. [° C.] | 1200 | | 1200 | | 1200 | | 1200 | |
| Density, vitreous [g/cm$^3$] | n.d. | | n.d. | | n.d. | | n.d. | |
| Density, ceram. [g/cm$^3$] | 2.51 | | 2.51 | | 2.49 | | 2.50 | |
| CTE(0; 50) [ppm/K] | −0.03 | | 0.00 | | 0.01 | | −0.06 | |
| CTE(20; 25) [ppm/K] | −0.013 | | 0.007 | | 0.014 | | −0.04 | |
| Zero crossing of CTE/T curve [° C.] | 27 | | 22.5 | | 23 | | 32 | |
| Young's modulus [GPa] | 123 | | 121 | | 118 | | 122 | |
| Poisson's ratio | 0.297 | | 0.301 | | 0.3 | | 0.298 | |
| Spec. Young's modulus [GPa × cm$^3$/g] | 48.94 | | 48.19 | | 47.34 | | 48.80 | |
| Proportion of amorphous material [% by vol.] | 11.3 | | 11.6 | | 10.8 | | 11.5 | |
| Proportion of cordierite [% by vol.] | 65.9 | | 59.6 | | 61.8 | | 60.0 | |
| Proportion of keatite [% by vol.] | 21.2 | | 26.9 | | 26.3 | | 26.5 | |
| Proportion of high-quartz [% by vol.] | 0 | | 0 | | 0 | | 0 | |
| Other crystal phases [% by vol.] | 1.6 (MgTi$_2$O$_4$, TiO$_2$) | | 1.9 (MgTi$_2$O$_4$, TiO$_2$) | | 1.1 (TiO$_2$) | | 2.0 MgTi$_2$O$_4$, TiO$_2$ | |

| | Ex. 17 | | Ex. 18 | | Ex. 19 | | Ex. 20 | |
|---|---|---|---|---|---|---|---|---|
| | wt. % | mol % | wt. % | mol % | wt. % | mol % | wt. % | mol % |
| Al$_2$O$_3$ | 27.3 | 17.2 | 26.9 | 17.0 | 30.2 | 19.3 | 30.0 | 19.3 |
| Li$_2$O | 1.5 | 3.3 | 1.5 | 3.3 | 1.4 | 3.0 | 1.4 | 3.0 |
| MgO | 9.8 | 15.5 | 9.6 | 15.4 | 9.9 | 16.0 | 9.9 | 16.0 |
| SiO$_2$ | 56.0 | 59.8 | 55.2 | 59.2 | 52.3 | 56.9 | 52.0 | 56.9 |
| TiO$_2$ | 4.9 | 3.9 | 4.8 | 3.9 | 4.9 | 4.0 | 4.9 | 4.0 |
| SnO$_2$ | 0.5 | 0.2 | | | | | | |
| ZnO | | | 1.2 | 1.0 | | | | |
| B$_2$O$_3$ | | | | | 0.5 | 0.3 | | |
| P$_2$O$_5$ | | | | | | | 1.1 | 0.5 |
| As$_2$O$_3$ | | | 0.8 | 0.3 | 0.8 | 0.5 | 0.8 | 0.3 |
| T$_g$ [° C.] | 728.3 | | 723 | | 732 | | 735 | |
| 10$^4$ dPas [° C.] | n.d. | | n.d. | | n.d. | | n.d. | |
| 10$^{13}$ dPas [° C.] | n.d. | | n.d. | | n.d. | | n.d. | |
| Max. ceramization temp. [° C.] | 1200 | | 1200 | | 1200 | | 1200 | |
| Density, vitreous [g/cm$^3$] | n.d. | | n.d. | | n.d. | | n.d. | |
| Density, ceram. [g/cm$^3$] | 2.53 | | 2.54 | | 2.52 | | 2.53 | |
| CTE(0; 50) [ppm/K] | 0.03 | | 0.10 | | 0.08 | | 0.10 | |

TABLE 1-continued

Compositions of green glasses/glass-ceramics and properties

| | | | | |
|---|---|---|---|---|
| CTE(20; 25) [ppm/K] | 0.04 | 0.11 | 0.10 | 0.11 |
| Zero crossing of CTE/T curve [° C.] | 18 | 8 | 12 | 7 |
| Young's modulus [GPa] | 124 | 121 | 126 | 125 |
| Poisson's ratio | 0.312 | 0.312 | 0.305 | 0.306 |
| Spec. Young's modulus [GPa × cm³/g] | 49.01 | 47.64 | 50.00 | 49.41 |
| Proportion of amorphous material [% by vol.] | 12.4 | n.d. | n.d. | n.d. |
| Proportion of cordierite [% by vol.] | 59.2 | n.d. | n.d. | n.d. |
| Proportion of keatite [% by vol.] | 25.6 | n.d. | n.d. | n.d. |
| Proportion of high-quartz [% by vol.] | 0 | n.d. | n.d. | n.d. |
| Other crystal phases [% by vol.] | 2.8 $MgTi_2O_4$, $TiO_2$ | n.d. | n.d. | n.d. |

| | Ex. 21 | | Comp. Ex. 1 | | Comp. Ex. 2 | |
|---|---|---|---|---|---|---|
| | wt. % | mol % | wt. % | mol % | wt. % | mol % |
| $Al_2O_3$ | 27.5 | 17.3 | 31.6 | 20.0 | 29.6 | 19.4 |
| $Li_2O$ | 1.5 | 3.3 | 3.2 | 7.0 | | |
| MgO | 9.8 | 15.6 | 11.2 | 18.0 | 11.7 | 19.4 |
| $SiO_2$ | 56.4 | 60.1 | 50.2 | 54.0 | 48.5 | 53.9 |
| $TiO_2$ | 4.3 | 3.5 | 3.7 | 3.0 | 6.1 | 5.1 |
| $ZrO_2$ | 0.5 | 0.2 | | | 4.1 | 2.2 |
| $T_g$ [° C.] | 737 | | 684 | | 772 | |
| $10^4$ dPas [° C.] | n.d. | | 1104 | | 1158 | |
| $10^{13}$ dPas [° C.] | n.d. | | 685 | | 778 | |
| Max. ceramization temp. [° C.] | 1200 | | 1200 | | 1200 | |
| Density, vitreous [g/cm³] | n.d. | | 2.60 | | 2.71 | |
| Density, ceram. [g/cm³] | 2.51 | | 2.51 | | 2.62 | |
| CTE(0; 50) [ppm/K] | −0.02 | | 0.09 | | 1.08 | |
| CTE(20; 25) [ppm/K] | −0.01 | | 0.09 | | | |
| Zero crossing of CTE/T curve [° C.] | 25 | | +8 | | −27.5 | |
| Young's modulus [GPa] | 120 | | approx. 90 | | 132 | |
| Poisson's ratio | 0.303 | | n.d. | | 0.302 | |
| Spec. Young's modulus [GPa × cm³/g] | 47.81 | | 35.91 | | 50.48 | |
| Proportion of amorphous material [% by vol.] | 13.9 | | 11.3 | | n.d. | |
| Proportion of cordierite [% by vol.] | 58.2 | | 32.3 | | n.d. | |
| Proportion of keatite [% by vol.] | 26.1 | | 48.9 | | n.d. | |
| Proportion of high-quartz [% by vol.] | 0 | | 0 | | n.d. | |
| Other crystal phases [% by vol.] | 1.8 $TiO_2$ | | 7.5 ($MgTi_2O_4$, spinel) | | n.d. | |

TABLE 2

Compositions of green glasses/glass-ceramics and properties

| | Ex. 22 wt. % | Ex. 23 wt. % | Ex. 24 wt. % | Ex. 25 wt. % | Ex. 26 wt. % |
|---|---|---|---|---|---|
| $Al_2O_3$ | 28.0 | 28.5 | 28.7 | 28.9 | 28.3 |
| $Li_2O$ | 1.8 | 2.0 | 1.7 | 1.6 | 1.6 |
| MgO | 9.5 | 9.9 | 9.9 | 9.9 | 9.7 |
| $SiO_2$ | 60.3 | 59.2 | 59.2 | 58.5 | 60.2 |
| $SnO_2$ | | | | 0.6 | |
| $MoO_3$ | 0.4 | 0.4 | 0.5 | 0.5 | 0.2 |
| $T_g$ [° C.] | n.d. | n.d. | n.d. | n.d. | n.d. |
| $10^4$ dPas [° C.] | n.d. | n.d. | n.d. | n.d. | n.d. |
| $10^{13}$ dPas [° C.] | n.d. | n.d. | n.d. | n.d. | n.d. |
| Max. ceramization temp. [° C.] | 1200 | 1200 | 1200 | 1200 | 1200 |
| Densitiy, vitreous [g/cm³] | n.d. | n.d. | n.d. | n.d. | n.d. |
| Density, ceram. [g/cm³] | n.d. | n.d. | n.d. | n.d. | n.d. |

TABLE 2-continued

Compositions of green glasses/glass-ceramics and properties

| | Ex. 22 wt. % | Ex. 23 wt. % | Ex. 24 wt. % | Ex. 25 wt. % | Ex. 26 wt. % |
|---|---|---|---|---|---|
| CTE(0; 50) [ppm/K] | n.d. | n.d. | n.d. | n.d. | n.d. |
| CTE(20; 25) [ppm/K] | n.d. | n.d. | n.d. | n.d. | n.d. |
| Zero crossing of CTE/T-curve [° C.] | n.d. | n.d. | n.d. | n.d. | n.d. |
| Young's modulus [GPa] | n.d. | n.d. | n.d. | n.d. | n.d. |
| Poisson's ratio | n.d. | n.d. | n.d. | n.d. | n.d. |
| Spec. Young's modulus [GPa × cm$^3$/g] | n.d. | n.d. | n.d. | n.d. | n.d. |
| Proportion of amorphous material [% by vol.] | <detection limit | <detection limit | <detection limit | <detection limit | <detection limit |
| Proportion of cordierite [% by vol.] | 65.0 | 65.1 | 68.4 | 72.6 | 71.5 |
| Proportion of keatite [% by vol.] | 35.0 | 34.9 | 31.6 | 27.4 | 28.5 |
| Proportion of high-quartz [% by vol.] | 0 | 0 | 0 | 0 | 0 |
| Other crystal phases [% by vol.] | 0 | 0 | 0 | 0 | 0 |

The Working Examples 1 to 26 describe glass-ceramics according to the invention, in contrast to the Comparative Examples 1 and 2.

In Table 1 working examples and comparative examples are shown comprising $TiO_2$ as crystallization nucleus former. In Table 2 working examples are shown having $MoO_3$ or a mixture of $MoO_3$ and $SnO_2$ as crystallization nucleus former. Working Examples 22 to 24 and 26 were melted under reducing conditions. Working Example 25 was melted under oxidizing conditions. Some properties such as thermal expansion, Young's modulus, density of the glass-ceramic could not be determined as fractures had formed during ceramization of the specimens. However, because of the determined crystal phases formed (table 3) it is assumed that the working examples having $MoO_3$ and the respective compositions can have a thermal expansion (CTE), zero crossing of the CTE/T curve, Young's modulus etc. in the preferred ranges as described above. In the Working Examples 22 to 26 no other crystal phases could be determined using XRD method.

The composition of Working Example 1 corresponds to a ratio of 9 parts of cordierite, 2 parts of high-quartz with an excess of $SiO_2$ and addition of crystallization nucleus formers. XRD analysis of the glass-ceramic of Working Example 1 indicates a proportion of 64.6% by volume of cordierite, 7.6% by volume of keatite and small amounts of rutile and $ZrTiO_4$, i.e. phases which function as crystallization nucleus formers. The proportions of crystal phases in % by volume and also the proportion of the amorphous phase are shown in Table 1.

Working Examples 1 and 2 show that a proportion of keatite which is not too high has only a small influence of the Young's modulus. Both examples display the same high value of 132 GPa, although Example 2 contains more than twice as much keatite, namely 14.2% by volume.

A comparison of the compositions of Working Example 1 and Comparative Example 2, which are similar in terms of molar proportions except for the proportion of lithium, shows the positive influence of keatite on the CTE value: the latter is reduced from 1.08 ppm/K to 0.16 ppm/K. The zero crossing of the CTE (corresponds to a minimum or maximum in the Δl/l curve and is indicated in the table as zero crossing of CTE/T curve) is also shifted to higher temperatures.

Figure 1:
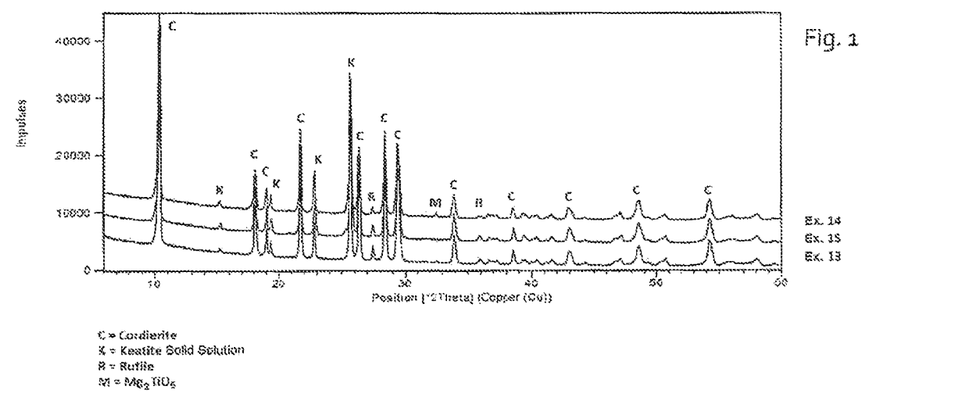

As mentioned above, it can be advantageous to use pure $TiO_2$ nucleus formation: the $ZrO_2$-free compositions of Working Examples 13 to 15 display the best values for the zero crossing. The Δl/l curves of these examples are shown in FIGS. 2 to 4. As can be seen in the figures, the minima of the CTE curves (and thus the zero crossings of the CTE/T curves) are at 22-27.5° C. Working Example 21 comprising $TiO_2$ and $SnO_2$ also shows such good results. These glass-ceramics according to the invention are therefore optimally adapted for lithographic applications at room temperature. Working Examples 13 to 15 and 21 also have the preferred phase content of ≥58% by volume of cordierite and 20-30% by volume of keatite (see Table 1). FIG. 1 shows the XRD patterns of Working Examples 13 to 15.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Glass-ceramic containing $SiO_2$, $Al_2O_3$, MgO and $Li_2O$, which contains cordierite as main crystal phase and whose secondary crystal phase comprises high-quartz solid solution and/or keatite solid solution.

2. Glass-ceramic according to claim 1, wherein the high-quartz solid solution and/or the keatite solid solution is lithium-containing.

3. Glass-ceramic according to claim 1, which has a CTE-T curve having a zero crossing in a temperature range (−20;50) and/or in a temperature range (−10;50).

4. Glass-ceramic according to claim 1, which has a Young's modulus of at least 100 GPa.

5. Glass-ceramic according to claim 1, which comprises the following components (in % by weight on an oxide basis):

| | |
|---|---|
| $SiO_2$ | 45-62 |
| $Al_2O_3$ | 20-40 |
| MgO | 5-16 |

-continued

| | |
|---|---|
| Li$_2$O | 0.3-6 |
| TiO$_2$ | 0-8 |
| MoO$_3$ | 0-2 |
| ZrO$_2$ | 0-4. |

6. Glass-ceramic according to claim 1, wherein, in each case based on the glass-ceramic, the main crystal phase is present in a proportion of at least 45% by volume and/or the secondary crystal phase is present in a proportion of at least 5% by volume and/or foreign crystal phases are present in a proportion of not more than 7.5% by volume.

7. Glass-ceramic according to claim 1, which has a proportion of crystal phases of at least 70% by volume.

8. Glass-ceramic according to claim 1, which contains one or more crystallization nucleus formers selected from the group consisting of TiO$_2$, ZrO$_2$, MoO$_3$, WO$_3$, SnO$_2$, Ta$_2$O$_5$ and Nb$_2$O$_5$.

9. Glass-ceramic according to claim 1, which has a porosity of <1%.

10. Glass-ceramic according to claim 1, which has an average coefficient of thermal expansion α of ≤0.5 ppm/K in a temperature range (0;50) and/or in a temperature range (20;25) and/or in a temperature range of 22° C. (+/−2° C.) and/or in a temperature range of 22° C. (+/−1° C.).

11. Glass-ceramic according to claim 1, which is present in the form of a plate.

12. Glass-ceramic component comprising a glass-ceramic containing SiO$_2$, Al$_2$O$_3$, MgO and Li$_2$O, which contains cordierite as main crystal phase and whose secondary crystal phase comprises high-quartz solid solution and/or keatite solid solution.

13. Glass-ceramic according to claim 1, which has a Young's modulus of at least 125 GPa.

14. Glass-ceramic according to claim 1, wherein, in each case based on the glass-ceramic, the main crystal phase is present in a proportion of at least 55% by volume and/or the secondary crystal phase is present in a proportion of at least 10% by volume and/or foreign crystal phases are present in a proportion of not more than 5% by volume.

15. Glass-ceramic according to claim 1, which has a porosity of <0.1%.

16. Glass-ceramic according to claim 1, which has an average coefficient of thermal expansion α of ≤0.1 ppm/K.

17. Glass-ceramic according to claim 1, which has an average coefficient of thermal expansion α of ≤0.02 ppm/K, in a temperature range (0;50) and/or in a temperature range (20;25) and/or in a temperature range of 22° C. (+/−2° C.) and/or in a temperature range of 22° C. (+/−1° C.).

18. Glass-ceramic according to claim 11, having a size of at least 30 cm×30 cm.

19. Glass-ceramic according to claim 11, having a thickness of from 0.5 mm to 40 cm.

* * * * *